US007023160B2

(12) United States Patent
Virtanen et al.

(10) Patent No.: US 7,023,160 B2
(45) Date of Patent: Apr. 4, 2006

(54) METHOD FOR CONTROLLING DOUBLY-FED MACHINE

(75) Inventors: Reijo Virtanen, Vantaa (FI); Osmo Pasuri, Ojakkala (FI)

(73) Assignee: ABB Oy, Helsinki (FI)

( * ) Notice: Subject to any disclaimer, the term of this patent is extended or adjusted under 35 U.S.C. 154(b) by 0 days.

(21) Appl. No.: 11/042,505

(22) Filed: Jan. 26, 2005

(65) Prior Publication Data

US 2005/0189896 A1 Sep. 1, 2005

Related U.S. Application Data

(63) Continuation of application No. PCT/FI04/00322, filed on May 26, 2004.

(30) Foreign Application Priority Data

May 27, 2003 (FI) ................................ 20030798

(51) Int. Cl.
*H02P 27/04* (2006.01)
*H02P 27/00* (2006.01)

(52) U.S. Cl. ...................... 318/438; 318/494; 318/143; 318/453; 318/454; 318/35; 318/254; 290/8

(58) Field of Classification Search ................ 318/438, 318/494, 143, 453, 454, 35–38, 254, 7, 11
See application file for complete search history.

(56) References Cited

U.S. PATENT DOCUMENTS 3,911,340 A * 10/1975 Plunkett ..................... 318/802
4,982,147 A * 1/1991 Lauw ......................... 318/729
5,028,804 A * 7/1991 Lauw ....................... 290/40 C
5,225,712 A * 7/1993 Erdman ....................... 290/44
5,239,251 A * 8/1993 Lauw ......................... 318/767
5,585,708 A * 12/1996 Richardson et al. ........ 318/800

(Continued)

FOREIGN PATENT DOCUMENTS

GB 281 076 7/1927

(Continued)

OTHER PUBLICATIONS

Rene Spee, Shibashis Bhowmik and Johan H. R. Enslin; "Novel control strategies for variable-speed doubly fed wind power generation systems" Renewable Energy, vol. 6, Issue 8, Nov. 1995. pp. 907-915.

(Continued)

*Primary Examiner*—David Martin
*Assistant Examiner*—Elias Hiruy
(74) *Attorney, Agent, or Firm*—Dykema Gossett PLLC

(57) ABSTRACT

A method for operating a doubly-fed machine by determining its rotational speed ($n_{act}$), forming a rotational speed reference ($n_{ref}$), measuring network voltage and current, and calculating network active power ($P_{act}$) and reactive power ($Q_{act}$). Thereafter, calculating shaft torque (T) based on active power ($P_{act}$) and rotating speed ($n_{act}$), forming a frequency reference ($F_{ref}$) for the inverter based on machine rotating speed ($n_{act}$), rotating speed reference ($n_{ref}$), shaft torque (T), and the known pole pair number and network frequency, forming a reactive power reference ($Q_{ref}$) for the machine. Forming an Ir compensation reference ($IR_{ref}$) for the inverter on the basis of the reactive reference ($Q_{ref}$) and the reactive power ($Q_{act}$), and controlling the inverter to produce rotor voltage based on frequency reference ($F_{ref}$) and the IR compensation reference

8 Claims, 2 Drawing Sheets

U.S. PATENT DOCUMENTS

| | | | | |
|---|---|---|---|---|
| 6,448,735 | B1 | 9/2002 | Gokhale et al. | |
| 6,741,059 | B1 * | 5/2004 | Gokhale et al. | 318/700 |
| 6,847,128 | B1 * | 1/2005 | Mikhail et al. | 290/44 |
| 6,856,040 | B1 * | 2/2005 | Feddersen et al. | 290/44 |
| 2003/0052643 | A1 * | 3/2003 | Sweo | 318/801 |
| 2003/0071596 | A1 * | 4/2003 | Gokhale et al. | 318/727 |
| 2004/0222642 | A1 * | 11/2004 | Siebenthaler et al. | 290/44 |

FOREIGN PATENT DOCUMENTS

| | | |
|---|---|---|
| GB | 460364 | 1/1937 |
| WO | 01/91279 | 11/2001 |
| WO | 03/026121 | 3/2003 |

OTHER PUBLICATIONS

Zhang, L.; Watthansarn, C.; Shepherd, W.; "Application of a matrix converter for the power control of a variable-speed wind-turbine driving a doubly-fed induction generator" 23rd International Conference on Industrial Electronics, Control and Instrumentation, 1997. IECON 97. vol.: 2, Nov. 9-14, 1997. pp.: 906-911.

Peresada, S.; Tilli, A.; Tonielli, A.; "Robust active-reactive power control of a doubly-fed induction generator" Industrial Electronics Society, 1998. IECON '98. Proceedings of the 24th Annual Conference of the IEEE, vol.: 3, Aug. 31 Sep. 4, 1998. pp.: 1621-1625.

* cited by examiner

METHOD FOR CONTROLLING DOUBLY-FED MACHINE

CROSS-REFERENCE TO RELATED APPLICATION

This application is a continuation of PCT/FI2004/000322, filed May 26, 2004.

BACKGROUND OF THE INVENTION

The present invention relates to a method for controlling a doubly-fed machine.

A doubly-fed machine is an electric machine, in which both a stator and a rotor can be fed with voltage. Most typically the doubly-fed machines are connected such that a stator winding of the machine is connected directly to a supplying network or a network to be supplied, and a rotor winding is connected to the same network through a controllable device, such as a cycloconverter or a frequency converter. Thus, the stator windings are directly affected by the network voltage, whereas rotor magnetization can be modified in a suitable manner.

The doubly-fed machine is generally used in applications with high nominal powers. When employed as a generator, typical applications include wind generators. In that case the generator is controllable in the vicinity of the nominal speed range by a converter connected to a rotor circuit. This converter should be rated to process only slip power in connection with the control. The control range achieved can be about 30% over or below the synchronous speed of the machine. The rating of the converter or the feeding devices thereof is relatively low as compared with a wide control range to be achieved, which makes the use of the doubly-fed machine an inviting alternative. Correspondingly, for the same reason in motor applications requiring high power the doubly-fed machine is an interesting alternative to consider as a motor, if said control range in the vicinity of the synchronous speed is sufficient.

According to prior art, the control of doubly-fed machines is implemented by modelling the machine as precisely as possible, and on the basis of the model an inverter is controlled to implement the targets set for the machine. This machine model is extremely complicated and includes numerous parameters that are often to be determined machine-specifically. The parameters to be determined include inductances and resistances of the machine, for instance. It should be noted that the parameter values are approximations of real quantities, which may vary in accordance with point of operation. In addition, the operation of a reliable model requires considerable computational capacity.

BRIEF DESCRIPTION OF THE INVENTION

The object of the present invention is to provide a method, which avoids the above-described drawbacks and enables the control of a doubly-fed machine in a reliable manner by using a simple method that does not require large computational capacity. In addition, the method makes it possible to use a standard scalar-controlled frequency converter for machine control. This is achieved with a method disclosed in the characterizing part of the independent claim. The preferred embodiments of the invention are disclosed in the subclaims.

The invention is based on the idea that a standard scalar-controlled frequency converter is used for controlling the doubly-fed machine. The frequency converter of this machine is typically controlled by giving it a frequency reference, according to which the frequency converter produces voltage of said frequency for its output. In a typical scalar-controlled frequency converter, in connection with frequency increase the amplitude of output voltage is increased at the same time. In addition, Ir compensation is applied to the input of the scalar-controlled frequency converter, which Ir compensation is employed in conventional motor drive to increase magnetization at low frequencies and thus torque, the decrease in which results from the effect of stator resistance. In the method of the invention these frequency converter inputs are used such that a slip frequency reference is fed instead of a normal frequency reference and the control usually applied to Ir compensation is used for controlling the reactive power of the machine.

An advantage with the method of the invention is that it is simple and yet reliable in operation when the doubly-fed machine is controlled. According to the invention, measurable parameters of the machine need not be known and thus the method can be applied as such in connection with machines of various types.

BRIEF DESCRIPTION OF THE DRAWINGS

In the following the invention will be described in greater detail in connection with preferred embodiments, with reference to the attached drawings, in which.

DETAILED DESCRIPTION OF THE INVENTION

Figure 1:
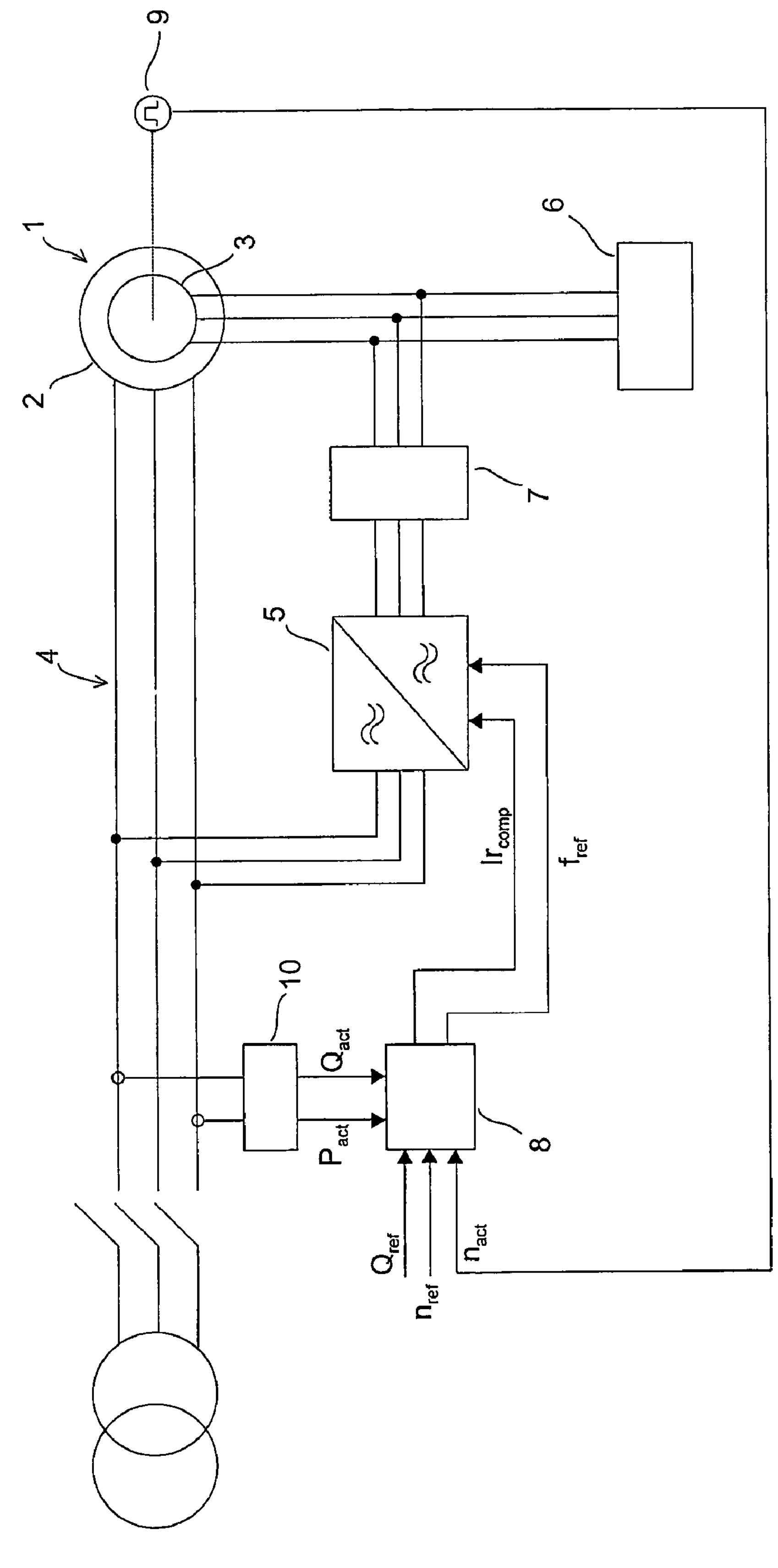
FIG. 1 shows a drive whole, where the method of the invention is utilized.

FIG. 1 shows, in principle, how a doubly-fed machine is connected to a power network and how the apparatus implementing the method of the invention relates to other equipment. A stator 2 of the doubly-fed machine is connected directly to the power network 4. A rotor 3 of the machine, in turn, is connected to the output of a frequency converter through slip-rings. A frequency converter 5 provides the rotor with desired magnetization for controlling the machine. FIG. 1 also shows starting resistors 6 necessary for starting the doubly-fed motor and a filter 7 intended for filtering the frequency converter voltage. The starting resistors are detached from the rotor circuit when the motor has achieved the speed of the controllable range, whereafter the frequency converter is used for speed control.

The frequency converter 5, which feeds the rotor 3, is connected to the power network 4. Depending on the point of operation the machine either takes power from the network via the stator or supplies it back thereto. In order for energy to pass through the frequency converter in either direction, the frequency converter should be provided with a bidirectional feeding bridge.

In the method of the invention, the scalar-controlled frequency converter is controlled with control circuits such that the control circuits 8 produce a frequency reference $f_{ref}$ and an Ir compensation reference $Ir_{ref}$ for the frequency converter. The first one is used in the method of the invention for controlling rotor slip frequency on the basis of the desired rotational speed of the machine and the second one is used for controlling the amount of reactive power produced by the machine on the basis of the reactive power reference. Other inputs for the control circuits 6 include the measured load power $P_{act}$ and reactive power $Q_{act}$ and the determined rotational speed $n_{act}$ of the machine. Rotational speed data is typically produced with a rotation speed sensor 9 or the like from the rotor of the machine. The power and the reactive power, in turn, are determined with determining means 10 by simply measuring network voltages and currents and calculating said powers therefrom.

Figure 2:
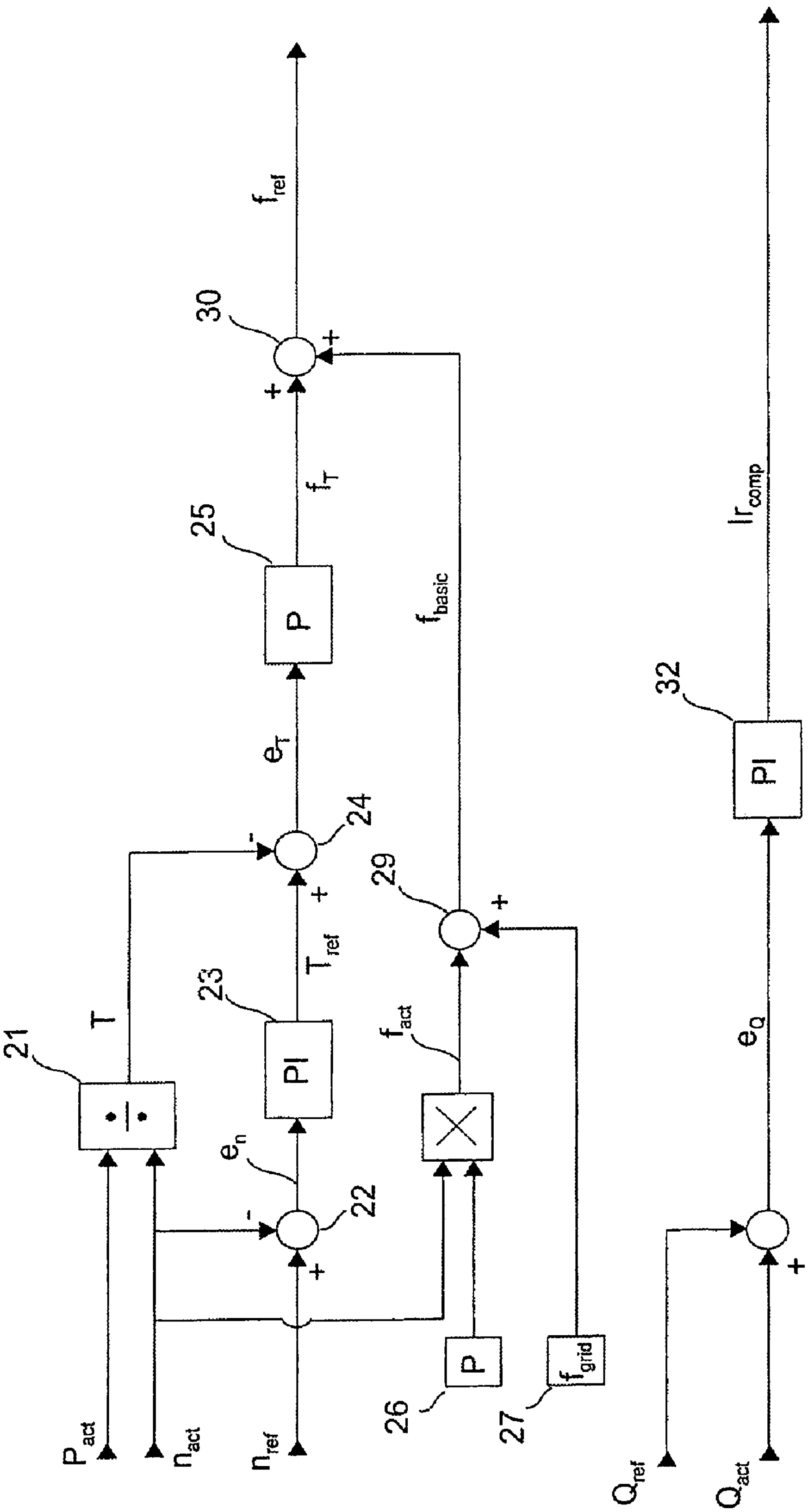
FIG. 2 shows a block diagram implementing the method of the invention.

FIG. 2 shows in greater detail the content of block 8 implementing the control circuit of the method in FIG. 1 according to the invention. In the control circuit of FIG. 2 the inputs are the above-mentioned power $P_{act}$, reactive power $Q_{act}$, rotational speed $n_{act}$ and rotational speed reference $n_{ref}$. In the following FIG. 2 and the method of the invention will be described particularly in connection with doubly-fed motor drive.

In accordance with the method of the invention, the shaft power $P_{act}$ of the motor is divided by the rotational speed $n_{act}$ of the motor determined by dividing means 21 so as to obtain the torque T of the motor in the manner known per se. From the speed reference $n_{ref}$ given to the motor is subtracted the rotating speed determined with subtracting means 22 obtaining a difference $e_n$ in speed. This difference $e_n$ is applied to a speed controller 23 to obtain a torque reference $T_{ref}$. The speed controller 23 is advantageously of PI controller type.

From the torque reference $T_{ref}$ produced there is subtracted with subtracting means 24 the torque T acting on the motor shaft to obtain a torque difference $e_T$. This difference $e_T$ is further applied to the input of a torque controller 25, whereby torque frequency $f_T$ is obtained from the torque controller. The aim of the quantity herein referred to as a torque frequency is to produce a necessary torque and thus to maintain the magnetic fluxes of the stator and the rotor in the same direction and synchronous. The torque controller 25 is advantageously of P controller type.

On commissioning the device, the pole pair number p of the machine, in this case of the motor, is fed into the control circuit of the machine. In FIG. 2 the pole pair number is given as a preset parameter 26. The pole pair number indicates the number of pole pairs of the motor and is thus a ratio between the mechanical frequency and the electrical frequency of the machine. Likewise, a second parameter 27 to be fed into the control circuit is a network frequency $f_{network}$ that should be given to ensure the operation of the control. Further, to simplify the commissioning, a frequency determination unit, which determines the network frequency for the control circuit, may also be arranged in the device implementing the method.

In accordance with the method of the invention, the determined, actual rotating speed $n_{act}$ and the pole pair number p are multiplied with multiplying means 28, whereby the electrical frequency $f_{act}$ of the motor can be calculated. In accordance with the method, from the given network frequency $f_{network}$ is subtracted with the subtracting means 29 the electrical frequency $f_{act}$ of the machine to obtain the basic frequency $f_{basic}$.

Further, in accordance with the invention the basic frequency $f_{basic}$ and the torque frequency $f_{torque}$ are summed with summing means to obtain a frequency reference $f_{ref}$, by which it is possible to control the scalar-controlled frequency converter.

In a simplified manner, the operation of the above-described control circuit is as follows: it is assumed initially that there is an equilibrium, where the rotating speed of the machine corresponds to the speed reference, whereby the difference $e_n$ and the basic frequency $f_{basic}$ are zero. As the determined shaft torque T changes, for instance decreases, the difference $e_T$ increases. This in turn leads to increasing torque frequency $f_T$ and simultaneously to increasing frequency reference $f_T$. This means that slip frequency, i.e. the frequency difference between the magnetic fluxes of the stator and the rotor, reduces, whereby the torque to be produced also reduces.

So, because the shaft torque reduces, the speed $n_{act}$ tends to increase as well. This contributes to the fact that the basic frequency $f_{basic}$ increases, which has a direct, increasing effect on the frequency reference through the adder 30. At the same time, the change in the speed affects the output of the speed controller 23 such that the torque reference $T_{ref}$ changes. The control circuit thus finds a new equilibrium, in which the torque to be produced corresponds to the required torque of the load and the speed corresponds to the speed reference.

In accordance with the invention, an Ir compensation reference, whose purpose is to control the reactive power produced by the machine, is further produced for the frequency converter. As described above, the reactive power $Q_{ref}$ of the machine is measured from the network. From this value is subtracted a reference value $Q_{ref}$ of the reactive power with subtracting means 31 to obtain a difference $e_Q$ of the reactive power. This difference is applied to a reactive power controller 32, which advantageously is a PI controller, to obtain an Ir compensation reference $Ir_{ref}$. This compensation reference makes the frequency converter either increase or decrease the rotor current and thus affect the amount of magnetization. The amount of magnetization, in turn, affects directly on reactive power production. According to a preferred embodiment of the invention the reactive power reference $Q_{ref}$ is zero. In that case the machine is run such that it will not produce any reactive power at all. In certain drives it is desirable, however, that a given amount of reactive power is produced to stabilize the operation of the power network.

It should be understood that even though the invention is described above particularly in association with a doubly-fed motor the method of the invention can also be applied to generator drives.

It is obvious to a person skilled in the art that the basic idea of the invention can be implemented in a variety of ways. The invention and its embodiments are thus not restricted to the above-described examples but they may vary within the scope of the claims.

The invention claimed is:

1. A method in connection with a doubly-fed machine, the machine comprising a stator, which is connected to a power network, and a rotor, which is connected to the power network through an inverter, the method comprising the steps of:

determining a rotational speed ($n_{act}$) of the machine, forming a rotational speed reference ($n_{ref}$) for the machine, measuring network voltage, measuring network current, and calculating network active power ($P_{act}$) and network reactive power ($Q_{act}$) from the network voltage and current, calculating a shaft torque (T) of the machine on the basis of the active power ($P_{act}$) and the rotating speed-($n_{act}$), forming a frequency reference ($F_{ref}$) for the inverter with a control circuit on the basis of the determined machine rotating speed ($n_{act}$), rotating speed reference ($n_{ref}$) and shaft torque (T), a pole pair number of the machine and a network frequency, forming a reactive power reference ($Q_{ref}$) for the machine, forming an Ir compensation reference ($IR_{ref}$) for the inverter with the control circuit on the basis of the reactive reference ($Q_{ref}$) and the reactive power ($Q_{act}$), and controlling the inverter to produce voltage for the rotor of the machine on the basis of the formed frequency reference ($F_{ref}$) and the IR compensation reference ($IR_{ref}$).

2. A method as claimed in claim 1, wherein the calculation of the machine shaft torque comprises a step of dividing the active power ($P_{act}$) by the rotational speed ($n_{act}$) to obtain the torque (T).

3. A method as claimed in claim 1, wherein the creation of the frequency reference ($f_{ref}$) comprises the steps of;

subtracting the machine rotational speed ($n_{act}$) from the rotational speed reference ($n_{ref}$) to obtain a speed difference ($e_n$), feeding the speed difference ($e_n$) to a speed controller to obtain a torque reference ($T_{ref}$), subtracting the machine shaft torque (T) from the torque reference ($T_{ref}$) to obtain a torque difference ($e_t$), feeding the torque difference ($e_t$) to a torque controller to obtain a torque frequency ($f_T$), multiplying the machine rotating speed ($n_{act}$) and the pole pair number (p) to obtain an electrical frequency ($f_{act}$) of the machine, subtracting the electrical frequency ($f_{act}$) of the machine from the network frequency ($f_{network}$) to obtain a basic frequency ($f_{basic}$) and summing the basic frequency ($f_{basic}$) and the torque frequency ($F_T$) to obtain a frequency reference ($f_{ref}$).

4. A method as claimed in claim 1, wherein the formation of the Ir compensation reference comprises the steps of:

subtracting the reactive power reference ($Q_{ref}$) from the network reactive power ($Q_{act}$) to obtain a reactive power difference ($e_q$), feeding the reactive power difference ($e_q$) to a reactive power controller to obtain an Ir compensation reference ($Ir_{comp}$).

5. A method as claimed in claim 4, wherein the Ir compensation reference is used for controlling the reactive power of the machine.

6. A method as claimed in claim 3, wherein the speed controller is a PI controller.

7. A method as claimed in claim 3, wherein the torque controller is a P controller.

8. A method as claimed in claim 4, wherein the reactive power controller is a PI controller.

* * * * *